12) United States Patent
Welsh et al.

(10) Patent No.: US 9,116,893 B2
(45) Date of Patent: Aug. 25, 2015

(54) NETWORK CONNECTED MEDIA GATEWAY FOR COMMUNICATION NETWORKS

(71) Applicant: QUALCOMM Incorporated, San Diego, CA (US)

(72) Inventors: John Michael Welsh, Austin, TX (US); Wayne G. Dunlap, Austin, TX (US); Benjamin M. Menchaca, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 13/655,395

(22) Filed: Oct. 18, 2012

(65) Prior Publication Data
US 2013/0103660 A1 Apr. 25, 2013

Related U.S. Application Data

(60) Provisional application No. 61/550,335, filed on Oct. 21, 2011.

(51) Int. Cl.
G06F 17/30 (2006.01)
H04N 21/21 (2011.01)
(Continued)

(52) U.S. Cl.
CPC ........ *G06F 17/30038* (2013.01); *G06F 17/301* (2013.01); *G06F 17/30864* (2013.01);
(Continued)

(58) Field of Classification Search
CPC .................... G06F 17/30011; G06F 17/30115; G06F 17/30106
USPC .......................................................... 707/705
See application file for complete search history.

(56) References Cited

U.S. PATENT DOCUMENTS 6,459,682 B1 10/2002 Ellesson et al.
6,493,317 B1 12/2002 Ma
(Continued)

FOREIGN PATENT DOCUMENTS

CN 101977146 A 2/2011
EP 1750394 A2 2/2007
(Continued)

OTHER PUBLICATIONS

Shan, et al., "Bandwidth Management for Supporting Differentiated Service Aware Traffic Engineering", IEEE Transactions on Parallel and Distributed Systems, IEEE Service Center, Los Alamitos, CA, US,vol. 18, No. 9, Sep. 1, 2007 , 1320-1331.
(Continued)

*Primary Examiner* — Cheryl Lewis
*Assistant Examiner* — Alexander Khong
(74) *Attorney, Agent, or Firm* — DeLizio Law, PLLC

(57) ABSTRACT

A network traffic managing node of a local area network, such as a router or gateway, can implement a network discovery and remote access mechanism for the local area network. A catalog of a plurality of files stored in a plurality of network devices of the local area network is created at the network traffic managing node based, at least in part, on information associated with the plurality of files determined using a network discovery procedure. The catalog of the plurality of files is provide to a remote network node of a wide area network in response to receiving a message from the remote network node requesting access to the plurality of files. One or more files are provided to the remote network node in response to receiving a message from the remote network node requesting the one or more files from the catalog of the plurality of files.

32 Claims, 5 Drawing Sheets

(51) Int. Cl.

| | |
|---|---|
| H04N 21/278 | (2011.01) |
| H04N 21/433 | (2011.01) |
| H04N 21/436 | (2011.01) |
| H04N 21/4363 | (2011.01) |
| H04N 21/442 | (2011.01) |
| H04N 21/462 | (2011.01) |
| H04N 21/60 | (2011.01) |
| H04N 21/61 | (2011.01) |
| H04L 12/28 | (2006.01) |
| H04L 29/08 | (2006.01) |

(52) U.S. Cl.
CPC ............ *H04L12/2812* (2013.01); *H04N 21/21* (2013.01); *H04N 21/278* (2013.01); *H04N 21/4332* (2013.01); *H04N 21/4363* (2013.01); *H04N 21/43615* (2013.01); *H04N 21/44227* (2013.01); *H04N 21/4622* (2013.01); *H04N 21/60* (2013.01); *H04N 21/6125* (2013.01); *H04L 67/16* (2013.01)

(56) References Cited

U.S. PATENT DOCUMENTS

| | | | |
|---|---|---|---|
| 6,591,299 | B2 | 7/2003 | Riddle et al. |
| 6,904,020 | B1 | 6/2005 | Love et al. |
| 7,043,659 | B1 | 5/2006 | Klein et al. |
| 7,215,678 | B1 | 5/2007 | Ahlfors et al. |
| 7,493,407 | B2 | 2/2009 | Leedom et al. |
| 7,664,048 | B1 | 2/2010 | Yung et al. |
| 7,782,786 | B1 | 8/2010 | Natarajan et al. |
| 7,957,291 | B2 | 6/2011 | Boch et al. |
| 8,004,973 | B2 | 8/2011 | Budhani et al. |
| 8,131,852 | B1 | 3/2012 | Miller et al. |
| 8,370,407 | B1 | 2/2013 | Devarajan et al. |
| 8,417,938 | B1 | 4/2013 | Considine et al. |
| 8,601,134 | B1 | 12/2013 | Sorenson, III et al. |
| 8,639,921 | B1 | 1/2014 | Sorenson, III et al. |
| 8,706,834 | B2 | 4/2014 | Sorenson, III et al. |
| 8,761,100 | B2 | 6/2014 | Negus et al. |
| 8,793,343 | B1 | 7/2014 | Sorenson, III et al. |
| 8,918,075 | B2 | 12/2014 | Maier et al. |
| 2002/0122387 | A1 | 9/2002 | Ni |
| 2003/0229720 | A1 | 12/2003 | Kiremidjian et al. |
| 2004/0105415 | A1 | 6/2004 | Fujiwara et al. |
| 2005/0052997 | A1 | 3/2005 | Montes Linares |
| 2005/0114541 | A1 | 5/2005 | Ghetie et al. |
| 2005/0185582 | A1 | 8/2005 | Wybenga et al. |
| 2006/0048142 | A1 | 3/2006 | Roese et al. |
| 2006/0206533 | A1* | 9/2006 | MacLaurin et al. ......... 707/200 |
| 2006/0251234 | A1 | 11/2006 | Cooke |
| 2007/0061433 | A1 | 3/2007 | Reynolds et al. |
| 2007/0143377 | A1 | 6/2007 | Waites |
| 2007/0168336 | A1* | 7/2007 | Ransil et al. ................ 707/3 |
| 2007/0180119 | A1 | 8/2007 | Khivesara et al. |
| 2008/0147735 | A1 | 6/2008 | Sloo |
| 2008/0267203 | A1 | 10/2008 | Curcio et al. |
| 2008/0273533 | A1 | 11/2008 | Deshpande |
| 2009/0059937 | A1 | 3/2009 | Kanada |
| 2009/0083326 | A1 | 3/2009 | Pelton |
| 2009/0180430 | A1 | 7/2009 | Fadell |
| 2009/0228462 | A1 | 9/2009 | Frieder et al. |
| 2009/0252219 | A1 | 10/2009 | Chen et al. |
| 2009/0300196 | A1 | 12/2009 | Haghpassand |
| 2009/0303908 | A1 | 12/2009 | Deb et al. |
| 2009/0320113 | A1 | 12/2009 | Larsen et al. |
| 2009/0323524 | A1 | 12/2009 | Kuhn |
| 2010/0023604 | A1 | 1/2010 | Verma et al. |
| 2010/0208614 | A1 | 8/2010 | Harmatos |
| 2010/0228650 | A1 | 9/2010 | Shacham et al. |
| 2010/0260048 | A1 | 10/2010 | Dolganow et al. |
| 2010/0287219 | A1* | 11/2010 | Caso et al. .................. 707/827 |
| 2010/0322255 | A1 | 12/2010 | Hao et al. |
| 2011/0106786 | A1 | 5/2011 | Waters et al. |
| 2011/0122810 | A1 | 5/2011 | Hodroj et al. |
| 2011/0231899 | A1 | 9/2011 | Pulier et al. |
| 2011/0282975 | A1 | 11/2011 | Carter |
| 2011/0289440 | A1 | 11/2011 | Carter et al. |
| 2012/0042216 | A1 | 2/2012 | Blubaugh |
| 2012/0072932 | A1 | 3/2012 | Atwater et al. |
| 2012/0096269 | A1 | 4/2012 | Mcalister |
| 2012/0185913 | A1 | 7/2012 | Martinez et al. |
| 2012/0330887 | A1* | 12/2012 | Young et al. .................. 707/610 |
| 2013/0007219 | A1 | 1/2013 | Sorenson, III et al. |
| 2013/0007854 | A1 | 1/2013 | Sorenson, III et al. |
| 2013/0007882 | A1 | 1/2013 | Devarajan et al. |
| 2013/0054759 | A1 | 2/2013 | Lim et al. |
| 2013/0054763 | A1 | 2/2013 | Van Der Merwe et al. |
| 2013/0100803 | A1 | 4/2013 | Menchaca et al. |
| 2013/0100955 | A1 | 4/2013 | Dunlap et al. |
| 2013/0103827 | A1 | 4/2013 | Dunlap et al. |
| 2013/0124465 | A1 | 5/2013 | Pingel et al. |
| 2013/0179593 | A1 | 7/2013 | Dunlap et al. |
| 2013/0211555 | A1 | 8/2013 | Lawson et al. |
| 2013/0212214 | A1 | 8/2013 | Lawson et al. |
| 2013/0219476 | A1 | 8/2013 | Lin et al. |
| 2013/0238752 | A1 | 9/2013 | Park et al. |
| 2014/0020072 | A1 | 1/2014 | Thomas |
| 2014/0095660 | A1 | 4/2014 | Chan |
| 2014/0148255 | A1 | 5/2014 | Chan |
| 2014/0189015 | A1 | 7/2014 | Chan et al. |
| 2014/0243100 | A1 | 8/2014 | Chan |

FOREIGN PATENT DOCUMENTS

| | | |
|---|---|---|
| EP | 1990960 A1 | 11/2008 |
| EP | 2273737 | 12/2011 |
| JP | 2008085536 | 4/2008 |
| KR | 20080086918 | 9/2008 |
| KR | 1020080086918 | 10/2010 |
| TW | 201322694 | 6/2013 |
| WO | 2006068548 A1 | 6/2006 |
| WO | 2007142567 A1 | 12/2007 |
| WO | 2010074619 A1 | 7/2010 |
| WO | 2013059744 A1 | 4/2013 |
| WO | 2013059760 A1 | 4/2013 |
| WO | 2013059742 A1 | 5/2013 |
| WO | 2013063142 A2 | 5/2013 |
| WO | 2013106454 A1 | 7/2013 |

OTHER PUBLICATIONS

"PCT Application No. PCT/US2012/061725 International Search Report and Written Opinion", Apr. 26, 2013, 18 pages.
"Partial International Search Report—PCT/US2012/061216—ISA/EPO—Jan. 30, 2013", 6 pages.
Co-Pending U.S. Appl. No. 11/197,773, filed Aug. 3, 2005, pp. 44.
Co-pending U.S. Appl. No. 11/969,829, filed Jan. 4, 2008, pp. 39.
Co-pending U.S. Appl. No. 13/655,399, filed Oct. 18, 2012, pp. 42.
Co-pending U.S. Appl. No. 13/655,602, filed Oct. 19, 2012, pp. 40.
Co-pending U.S. Appl. No. 13/659,579, filed Oct. 24, 2012, pp. 53.
Co-pending U.S. Appl. No. 13/737,387, filed Jan. 9, 2013, pp. 37.
Co-pending U.S. Appl. No. 61/550,335, filed Oct. 21, 2011, pp. 18.
Co-pending U.S. Appl. No. 61/550,339, filed Oct. 21, 2011, pp. 18.
Co-pending U.S. Appl. No. 61/550,344, filed Oct. 21, 2011, pp. 21.
Co-pending U.S. Appl. No. 61/550,814, filed Oct. 24, 2011, pp. 34.
Co-pending U.S. Appl. No. 61/584,628, filed Jan. 9, 2012, pp. 16.
Fgee, E.B., et al., "Implementing an IPv6 QoS management scheme using flow label & class of service fields", Electrical and Computer Engineering, 2004. Canadian Conference on Niagara Falls, Ont., Canada May 2-5, 2004, Piscataway, NJ, USA, IEEE, US, May 2, 2004, p. 1049, XP010734004, DOI: 10.1109/CCECE.2004.1345298 ISBN: 978-0-7803-8253-4 see sections 2.2 and 3.1.
Giroux, N., et al., "Quality of Service in ATM networks; state-of-the-art traffic management. Chapter 2", 1998, Prentice Hall PTR, XP002691732, ISBN: 0-13-095387-3 pp. 10-32, ATM traffic contract. Detailed quality of service definition.
Bicket, John C., "Bit-rate Selection in Wireless Networks", Massachusetts Institute of Technology, http://dspace.mit.edu/handle/1721.1/34116,(Feb. 2005), pp. 50.

(56) References Cited

OTHER PUBLICATIONS

Thottan, Marina et al., "Impact of 802.11e EDCA on Mixed TCP-based Applications", In Proceedings of the 2nd annual international workshop on Wireless internet, ACM International Conference Proceeding Series, vol. 220, http://portal.acm.org/citation.cfm"id=1234161.1234187, Aug. 2-5, 2006, pp. 9.

Preparing the WLAN for Voice, Avaya Inc., www.avaya.com/master-usa/en-us/resource/assets/whitepapers/ef-lb2731.pdf,(May 2005), pp. 16.

Suzuki, K., et al., "Home network with cloud computing for Home Management", Consumer Electronics (ISCE), 2011 IEEE 15th International Symposium on, IEEE, Jun. 14, 2011, pp. 421-425, XP032007891, DOI: 10.1109/ISCE.2011.5973862 ISBN: 978-1-61284-843-3 the whole document.

International Search Report and Written Opinion—PCT/US2012/061214—ISA/EPO—Jan. 8, 2013.

PCT Application No. PCT/US2012/061216 International Search Report, Mar. 21, 2013, 18 pages.

"PCT Application No. PCT/US2012/061236 International Search Report", Jan. 23, 2013, 13 pages.

"PCT Application No. PCT/US2013/020863 International Search Report", Mar. 15, 2013, 13 pages.

"U.S. Appl. No. 12/146,141 Final Office Action", Sep. 12, 2012, 19 pages.

"U.S. Appl. No. 12/146,141 Office Action", Apr. 12, 2012, 20 pages.

"PCT Application No. PCT/US2012/061725 Written Opinion of the IPEA", Feb. 7, 2014, 7 pages.

"PCT Application No. PCT/US2012/061216 Written Opinion of the IPEA", Oct. 31, 2013, 9 pages.

"PCT Application No. PCT/US2012/061236 Written Opinion of IPEA", Sep. 25, 2013, 7 pages.

"PCT Application No. PCT/US2013/020863 Written Opinion of the IPEA", Dec. 6, 2013, 7 pages.

"U.S. Appl. No. 13/655,399 Office Action", Jul. 10, 2014, 19 Pages.

"U.S. Appl. No. 13/659,579 Office Action", Nov. 3, 2014, 18 pages.

"Korean Patent Application No. 1020147007407, KIPO Notice of Grounds for Rejection", Nov. 27, 2014, 12 pages.

"Korean Patent Application No. 10-2014-7007531, KIPO Notice of Grounds for Rejection", Nov. 26, 2014, 10 pages.

"U.S. Appl. No. 13/737,387, Office Action", Jan. 15, 2015, 24 pages.

* cited by examiner

NETWORK CONNECTED MEDIA GATEWAY FOR COMMUNICATION NETWORKS

RELATED APPLICATIONS

This application claims the priority benefit of U.S. Provisional Application No. 61/550,335 filed Oct. 21, 2011.

BACKGROUND

Embodiments of the inventive subject matter generally relate to the field of communication networks and, more particularly, to a network connected media gateway for communication networks.

Local area networks (LANs), such as home or office networks, typically include a router (or gateway) that connects the LAN to a wide area network (WAN) and routes packets between the two networks. Various network devices in a LAN can access and download information from the Internet via a router, and the router can manage the various packet streams from the different network devices accessing the Internet. The router of the LAN can also provide various security features, such as a firewall, to prevent unauthorized or malicious attempts to remotely access the LAN.

SUMMARY

Various embodiments are disclosed for implementing a network discovery and remote access mechanism for a local area network. In one embodiment, a plurality of files stored in a plurality of network devices of the local area network are discovered. A catalog of the plurality of files is created based, at least in part, on information associated with the plurality of files. The catalog of the plurality of files is provided to a remote network node of a wide area network in response to receiving a message from the remote network node requesting access to the plurality of files stored in the plurality of network devices of the local area network. One or more files are provided to the remote network node in response to receiving a message from the remote network node requesting one or more files from the catalog of the plurality of files.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
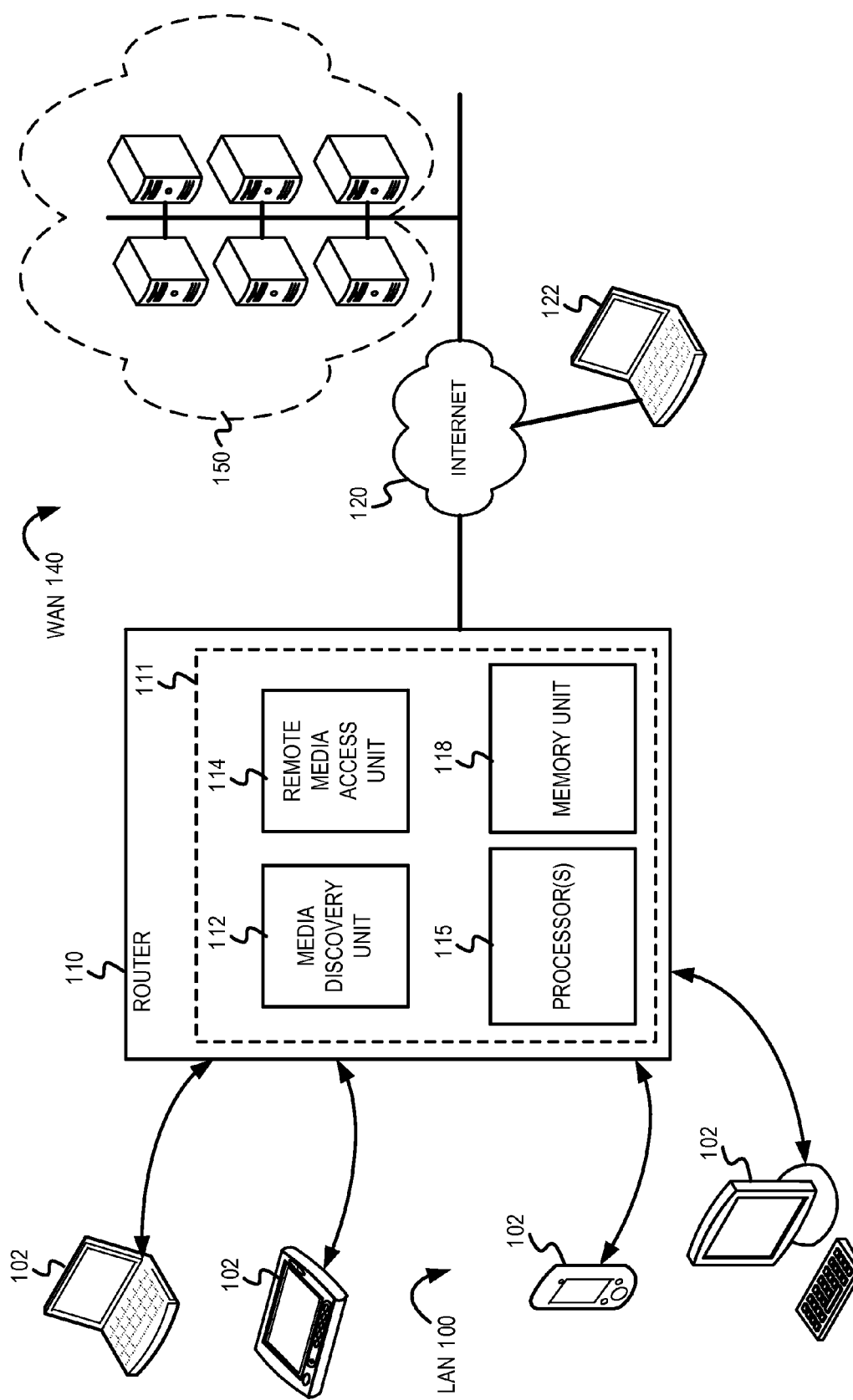
FIG. 1 is an example block diagram illustrating a wide area network connected media gateway for implementing network media discovery and remote access for a local area network, according to some embodiments.

The description that follows includes exemplary systems, methods, techniques, instruction sequences and/or computer program products that embody techniques of the present inventive subject matter. However, it is understood that the described embodiments may be practiced without these specific details. For instance, although some examples focus on a mechanism for discovering and cataloging media files stored in network devices of a home network using a router in the home network, in other implementations a router (or other type of network traffic management node) described herein may also be configured to discover and catalog text files and other suitable types of data files stored in network devices of other types of networks (e.g., other types of LANs, such as an office network). In other instances, well-known instruction instances, protocols, structures and techniques have not been shown in detail in order not to obfuscate the description.

Various network devices in a LAN, such as a home or office network, can access the Internet via a router (or gateway) by using a wireless communication protocol (e.g., IEEE 802.11a/b/g/n), a powerline communication protocol (e.g. HomePlug AV), and/or other types of wired/wireless communication protocols (e.g., Ethernet). Each of the network devices may store digital media and text files. For example, a notebook computer may store one or more video or music files downloaded from the Internet, a mobile phone can store one or more image files after the user takes pictures with the embedded digital camera, a desktop computer can store various text files, etc. When the LAN is accessible to a user of one of the network devices (wired or wireless), the user can typically access the media files stored in most or all of the other network devices in the LAN (e.g., if the devices are network-compatible and are configured to share the stored files). For example, the user can access files or send files using a peer-to-peer wireless connection, using a wireless connection through the router of the LAN, using a wired connection such as Ethernet, etc. However, when the user is located remotely, the user typically cannot remotely access media files stored in the network devices within the LAN.

In some embodiments, a router (or other type of network traffic managing node) in a LAN may be configured to implement a network media discovery and remote access mechanism to allow a user to remotely access the media files (and other types of files, such as text files) that are stored in the various network devices of the LAN. As will be further described below, the router may first discover the media files that are stored at the various network devices of the LAN and obtain information associated with the media files. The router may create a catalog of the media files based on the information obtained during the discovery process. The router can then send the catalog of the media files to a remote node in a WAN in order to be presented to the user. The user can remotely access the media files stored in the LAN by selecting one or more of the media files from the catalog of media files received from the router, as will be further described below with reference to FIGS. 1-5.

FIG. 1 is an example block diagram illustrating a wide area network connected media gateway for implementing network media discovery and remote access for a local area network, according to some embodiments. As shown in FIG. 1, a LAN 100 comprises a plurality of network devices 102 and a router 110. The plurality of network devices 102 may include various type of wired and wireless networking devices, such as notebook computers, tablet computers, mobile phones, desktop computers, digital cameras, televisions, gaming consoles, smart appliances, and other suitable network devices. The router 110 (or gateway) is a node in a communication network that receives and routes packets from and to the communication network. The router 110 is a network traffic managing node between two or more networks that receives, processes, and routes packets associated with the networks. It is noted, however, that in other embodiments the LAN 100 may include other types of network traffic managing nodes and/or network traffic managing nodes that are configured to perform various functions for the network(s), e.g., a server computer system that incorporates one or more of a cable modem, gateway/router, wireless access point, bridge, switch and/or storage, which may also implement the functionality describe herein with reference to FIGS. 1-5. As shown in FIG. 1, the router 110 allows the network devices 102 of the LAN 100 to access the WAN 140 and receive content from the WAN 140. The LAN 100 is one of many LANs that form the WAN 140, which is may be generally referred to as the Internet 120. As illustrated, the WAN 140 may also include various networks of servers (and other network devices and software). In one example, one of the networks of servers can implement cloud computing on the Internet 120, which will be referenced herein as the cloud computing network 150 (or the cloud 150).

In some embodiments, the router 110 includes a media discover unit 112, a remote media access unit 114, one or more processors 115, and a memory unit 118. The media discovery unit 112, the remote media access unit 114, the one or more processors 115, and the memory unit 118 of the router 110 are configured to implement a network media discovery and remote access mechanism to allow users remote access to media files (and other types of files) in the LAN 100. For example, the media discovery unit 112 may be configured to implement the functionality and networking protocols for discovering the media files stored in the various network devices 102 of the LAN 100. The media discovery unit 112 may also be configured to obtain and analyze information associated with the media files to create a catalog of media files, as will be further described below. In some embodiments, the one or more processors 115 of the router 110 can execute program instructions (e.g., stored in the memory unit 118) associated with the media discover unit 112 to implement the media discovery and information analysis techniques described herein. The remote media access unit 114 may be configured to receive communications from remote network nodes in the WAN 140 and verify/authenticate that the communications are from authorized users, entities, or services. The remote media access unit 114 may also be configured to implement the remote access mechanism for the router 110 to provide access to media files stored in the LAN to a user at a remote network node, as will be further described below. In some embodiments, the one or more processors 115 of the router 110 can execute program instructions (e.g., stored in the memory unit 118) associated with the remote media access unit 114 to implement the mechanism at the router 110 described herein for allowing remote access to the media files discovered in the LAN 100.

As shown in FIG. 1, in some implementations, the router 110 may include a network interface card (or module) 111. The network interface card 111 may implement the media discover unit 112, the remote media access unit 114, the one or more processors 115, and a memory unit 118 (e.g., in one or more integrated circuits). In other implementations, the router 110 may include a plurality of network interface cards and circuit boards (including network interface card 111), and the plurality of network interface cards may implement the media discover unit 112, the remote media access unit 114, the one or more processors 115, and a memory unit 118. Although not shown in FIG. 1, in some implementations, the router 110 may include one or more additional processors and memory units (and other components) besides processor(s) 115 and memory unit 118. For example, the router 110 may include one or more processors and one or more memory units in one or more additional circuit boards.

Figure 2:
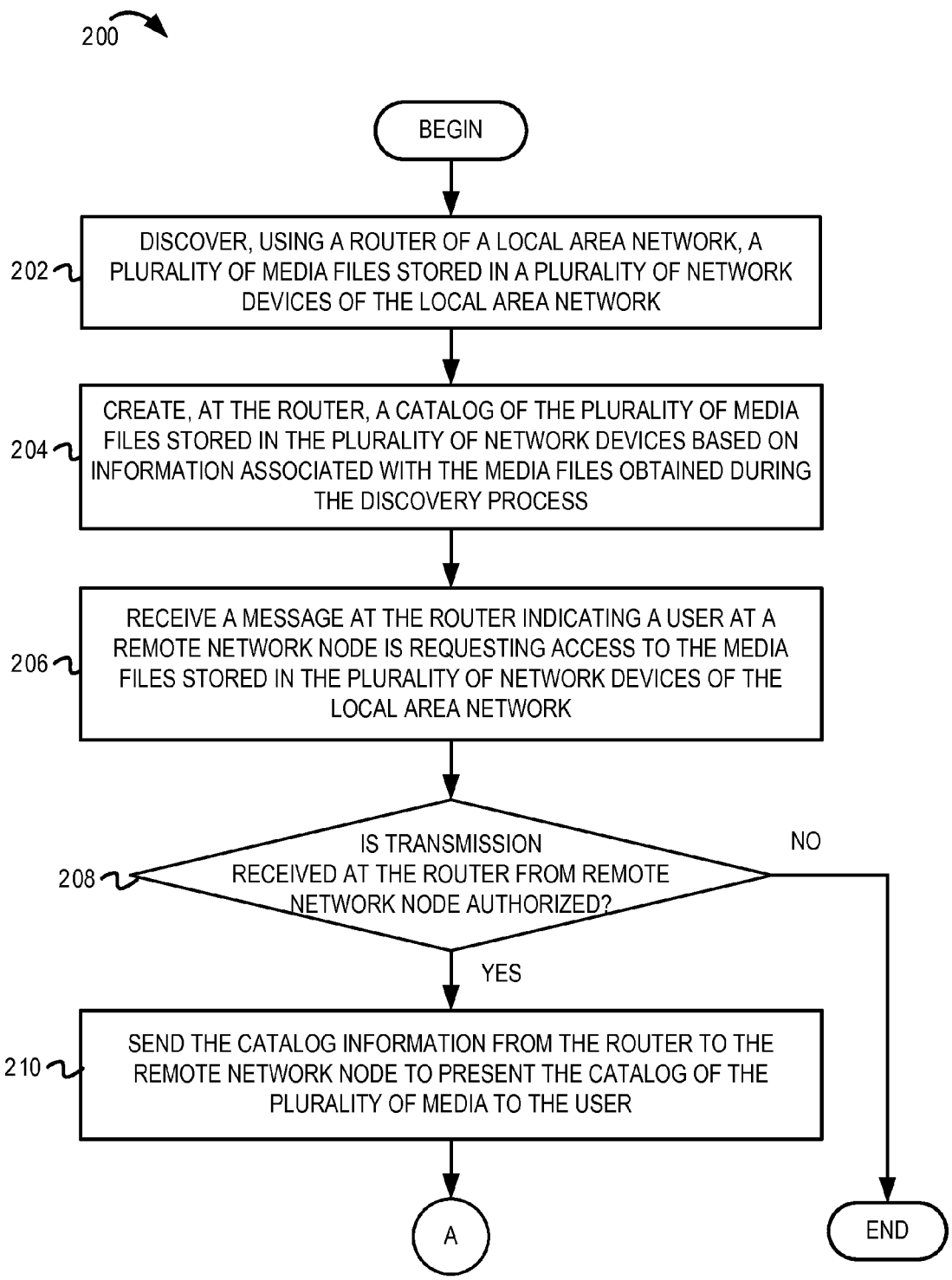
FIG. 2 is a flow diagram illustrating example operations for implementing a network media discovery and remote access mechanism in a wide area network connected media gateway, according to some embodiments.
Figure 3:
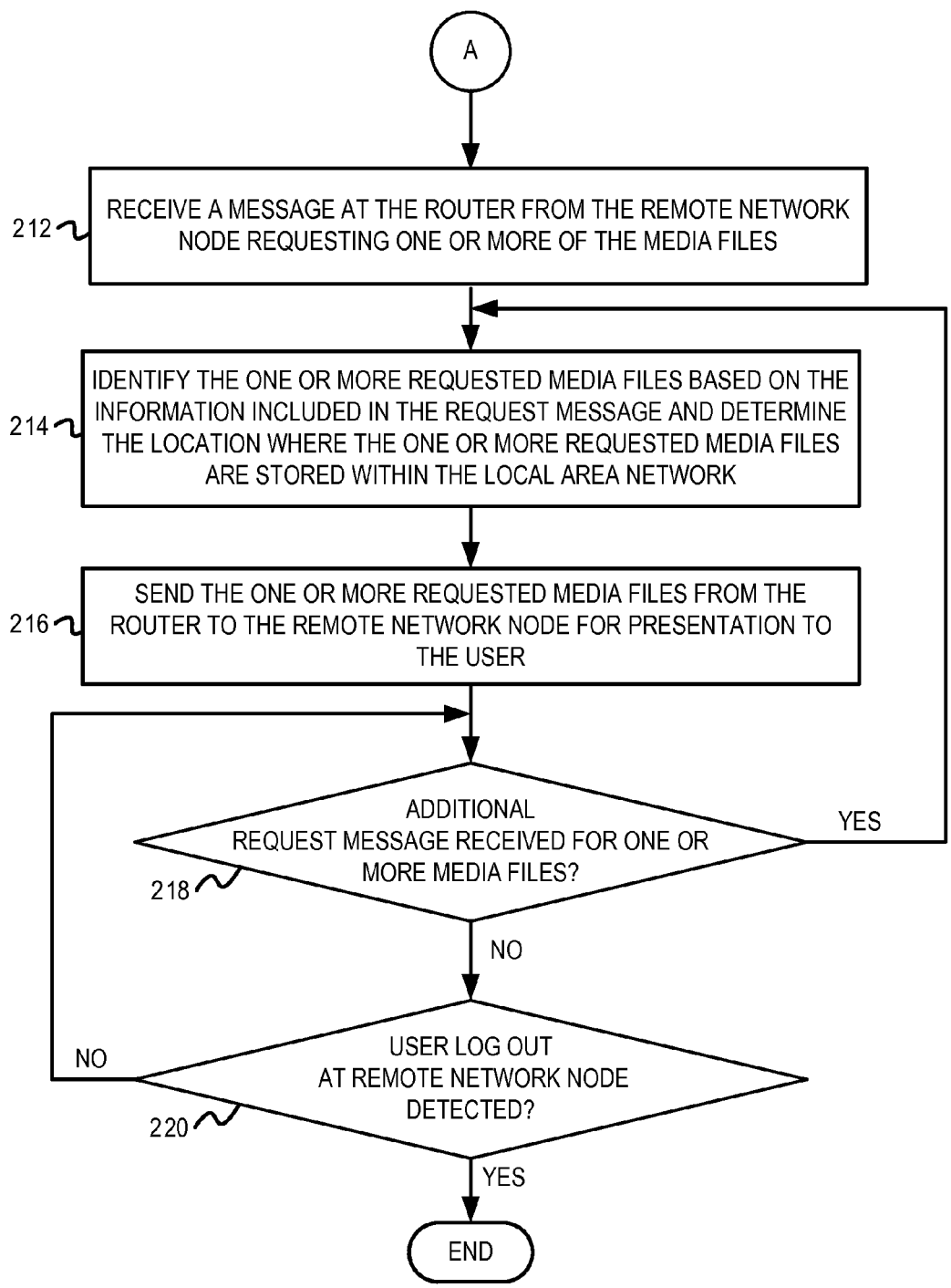
FIG. 3 is a continuation of the flow diagram of FIG. 2 illustrating additional example operations for implementing the network media discovery and remote access mechanism in a wide area network connected media gateway, according to some embodiments.
Figure 4:
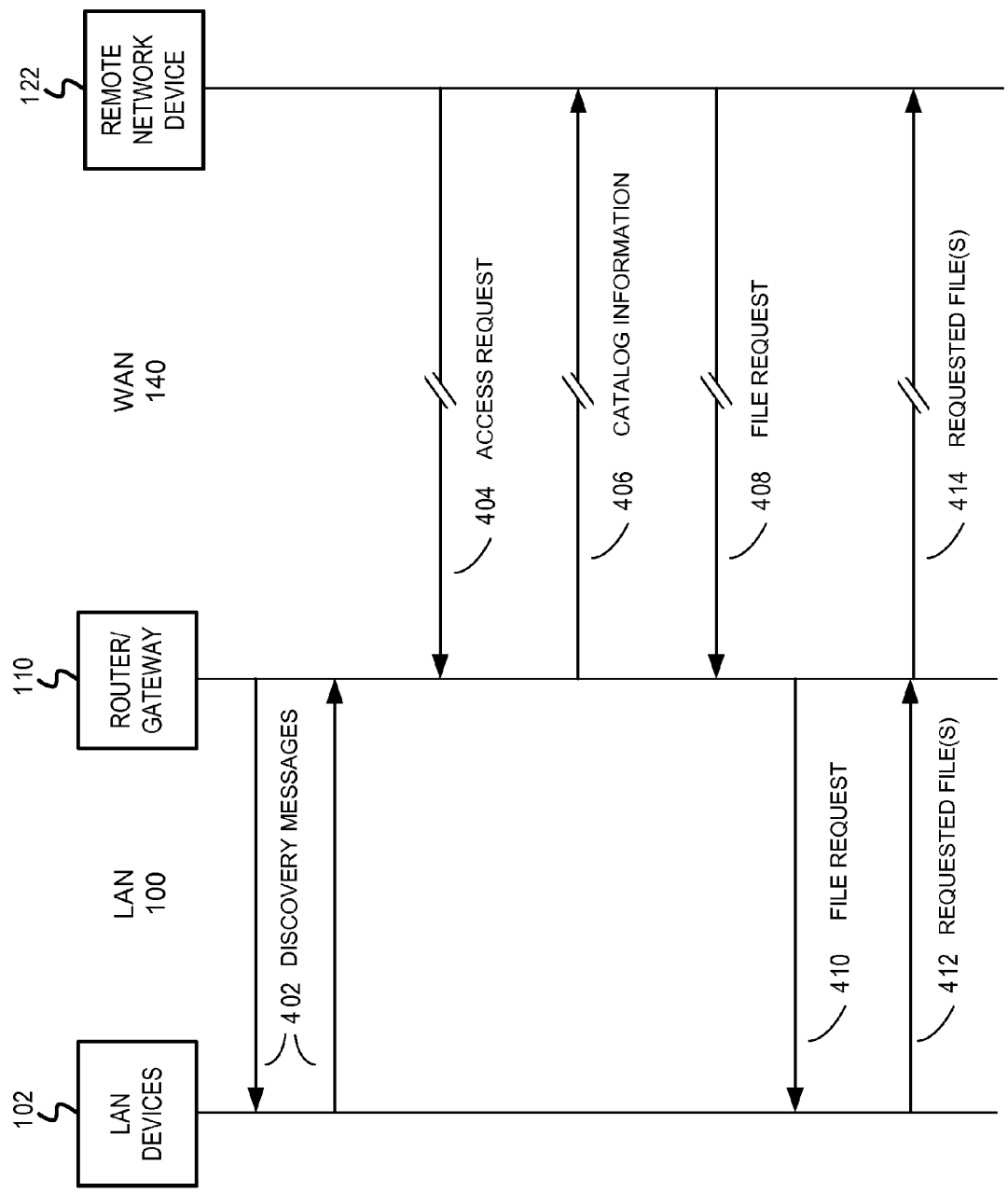
FIG. 4 is a messaging diagram illustrating example communications exchanged by the network devices to implement the network media discovery and remote access mechanism, according to some embodiments.

FIG. 2 and FIG. 3 are flow diagrams ("flows") illustrating example operations 200 for implementing a network media discovery and remote access mechanism in a wide area network connected media gateway, according to some embodiments. The flows begin at block 202 of FIG. 2 and continue with block 212 of FIG. 3. FIG. 4 is a messaging diagram illustrating example communications exchanged by the network devices to implement the network media discovery and remote access mechanism, according to some embodiments. The messaging diagram will be referenced within the description of FIGS. 2 and 3.

At block 202, media files stored in the plurality of network devices 102 of the LAN 100 are discovered at the router 110. For example, the media discovery unit 112 of the router 110 discovers digital media files, such as digital audio, video, and/or image files, stored in the plurality of network devices 102. It is noted that the media discovery unit 112 may also discover other types of files, such as text files or other types of data files, in addition to media files. In some implementations, the router 110 may be a Digital Living Network Alliance (DLNA) compatible network device that implements DLNA compliant protocols to discover the media files stored in the DLNA-compatible network devices 102 of the LAN 100. For example, the router 110 can implement Universal Plug and Play (UPnP) protocols to discover the media files in the LAN 100. It is noted, however, that in other implementations the router 110 can implement other suitable networking protocols or a combination of networking protocols to discover the media files stored in the network devices 102 of the LAN 100.

As part of the discovery process, the media discovery unit 112 of the router 110 obtains information associated with the media and text files that are stored in the network devices 102. For example, the media discovery unit 112 can obtain the file extension, the file name, and/or metadata associated with each of the media files, in order to determine the type of media file (e.g., type of audio, video or image file) and information associated with the content of the media file (e.g., title of movie/song, duration of movie/song, artist/actor names, time/date stamp of image, file size, etc.). In addition to obtaining the information associated with the media files and the information associated with the content of the media files, the media discovery unit 112 may also obtain information associated with each of the network devices 102 where the corresponding media files are stored. For example, the media discover unit 112 may obtain a device ID (e.g., manufacturer model and/or serial number), device address (e.g., a media access control (MAC) address, IP address, etc.), a device type (e.g., notebook computer, television, DVR, etc.), and/or device resources/capabilities (e.g., IEEE 802.11n, Bluetooth®, and Ethernet communication capabilities).

In some implementations, the media discover unit 112 can obtain the information associated with the media files, the information associated with the content of the media files, and the information associated with the corresponding network devices 102 by periodically sending discovery request messages to the network devices 102 and receiving the requested information from the network devices 102 in discovery response messages (e.g., see discovery messages 402 shown in FIG. 4). In some implementations, the media discovery unit 112 can obtain the information by receiving messages from the network devices 102. For example, the network devices 102 can automatically send updated information when the stored media files are modified (e.g., new media file added, media file deleted, etc.), and/or the network devices 102 can send the information periodically whether or not the information is updated. It is noted, however, that in other implementations the information can be obtained by sending requests to some devices and automatically receiving the information from other devices, or the information can be obtained by various other techniques utilizing specific networking protocols. After block 202, the flow continues at block 204.

At block 204, a catalog is created of the plurality of media files stored in the plurality of network devices 102 based on information associated with the media files that is obtained during the discovery process. For example, the media discovery unit 112 of the router 110 creates a catalog of the media files that are discovered in the LAN 100 based on the information associated with the media files, the information associated with the content of the media files, and the information associated with the corresponding network devices 102. As described above, in some implementations, the media discovery unit 112 obtains the file extension, the file name, and/or metadata associated with the media and text files that are stored in the network devices 102 of the LAN 100, and also information associated with the corresponding network devices 102. The media discovery unit 112 can utilize the file related information obtained from the network devices 102 to create the catalog the media files at the router 110. For example, the file extensions (e.g., .mpeg, .mp3, .jpg, .txt, etc.) can indicate the category of file (e.g., video, audio, image, text, etc.) and also the format of the file. Based on the file related information, the media discovery unit 112 can catalog the media files based on the categories of media files, such as video, audio, image, and text files. Also, within each category, the catalog can include sub-categories or types of media files. For example, within each category, the catalog can be organized by file extension or file format. Within the video category, the media discovery unit 112 can organize the video files into movies and video clips and/or by video file extensions, for example.

Also, the metadata associated with the media and text files can indicate information associated with the media file content (e.g., title of movie/song, duration of movie/song, artist/actor names, time/date stamp of image, file size, etc.). In one example, the media discovery unit 112 can parse the metadata associated with the files to determine this information. Based on the metadata and other related information, within each category, the catalog can be organized according to the metadata, such as by title in alphabetical order. In another example, the digital video and music files can be organized by movie or music genre. It is noted, however, that the media discover unit 112 can organize the media and text files in a variety of ways, and may offer users the option to configure the way the catalog is organized based on the available information. For each catalog entry associated with a media file, the media discovery unit 112 can also include location and other information associated with the network device 102 where the media file is stored. For example, as described above, the media discovery unit 112 may associate a device ID (e.g., manufacturer model and/or serial number) and a device address (e.g., a media access control (MAC) address, IP address, etc.) with each catalog entry associated with a media file, in order to enable access to the media file. As was described previously, although some examples describe creating a catalog of media files, it is noted that in some implementations the router 110 may also catalog text files and other types of data files in addition to media files. After block 204, the flow continues at block 206.

At block 206, a message is received at the router 110 indicating that a user at a remote network node in the WAN 140 is requesting access to one or more media files stored in the network devices 102 of the LAN 100. For example, the user can directly access the router 110 remotely via the Internet 120 using a client application (e.g., web browser or web-based router interface) running in the network device 122, and send a message (e.g., one or more IP packets) to the router 110 (e.g., using the router's IP address and/or other network address) requesting the catalog of the media files available in the LAN 100. In another example, the user of the network device 122 can remotely access the router 110 using a service provided by the cloud computing network 150. The cloud computing network 150 can host a website or other type of web or cloud interface where the user can log in to remotely access the router 110 and send a request message for the router 110 to send the catalog of the media files discovered in the LAN 100. In one implementation, when the user logs in for access to the router 110 via the client application or via the cloud computing network 150 (or via other remote access means), the request message (e.g., access request 404 shown in FIG. 4) for the catalog of media files is automatically sent from the client application or the cloud 150 in response to verifying and authenticating the user credentials. In another implementation, using the client application or the cloud 150, the request message for the catalog of media files is sent in response to the user selecting an option in the user interface after the user logs in. In some implementations, after the catalog of media files is received at the client application or the cloud 150, the user can request an updated catalog of media files at any time by selecting an update option in the user interface. It is noted, however, that in other embodiments the user can access the router 110 and obtain the catalog of media files via other web-based remote access mechanisms, or via mobile broadband remote access mechanisms. After block 206, the flow continues at block 208.

At block 208, it is determined whether the transmission received at the router 110 from the remote network node is authorized. In one implementation, the remote media access unit 114 of the router 110 verifies and authenticates the user credentials entered at the remote node in the WAN 140 (e.g., via the client application or via the cloud 150). The remote media access unit 114 can also verify and authenticate the service or application that sent the message requesting the catalog of media files; for example, the remote media access unit 114 can verify and authenticate the client application running in the network device 122 or the service provided by the cloud 150. In some implementations, in addition to verifying and authenticating user credentials and/or the service/application associated with the remote network node, the remote media access unit 114 and the remote network node may implement encryption and other security techniques for transmission of data and other messages. If it is determined that the transmission from the remote network node is not authorized, the transmission is discarded and the flow ends. If it is determined that the transmission from the remote network node is authorized, the flow continues at block 210.

At block 210, the catalog information is sent from router 110 to the WAN 140 to present the catalog of the plurality of media files to the user. For example, the remote media access unit 114 may send the catalog information from the router 110 directly to the network device 122 (e.g., see catalog information 406 shown in FIG. 4), the catalog information is stored at the network device 122, and then the catalog of the plurality of media files is presented on the display of the network device 122 using the client application (e.g., a web browser or other user interface to the router). In another example, the remote media access unit 114 may send the catalog information from the router 110 to the cloud computing network 150, the catalog information is stored in the cloud 150, and then one of the servers in the cloud 150 can present the catalog of the media files on the website or cloud interface (or other web-based remote access service) where the user is logged in. For example, the user may log in at the website or cloud interface running in one or more of the servers of the cloud 150 that allows the user to remotely access the router 110, receive the catalog information, and present the catalog of media files to the user. As illustrated in FIG. 1, in some embodiments, the remote media access unit 114 of the router 110 may implement the networking protocols (e.g., TCP/IP) for communicating with the client device 122 and/or the cloud 150 via the WAN 140.

In some implementations, the remote media access unit 114 of the router 110 may send the catalog of media files that is created at the router 110 directly to the network device 122, to one or more servers of the cloud computing network 150, or to one or more other servers in the Internet 120, in order to present the catalog of media files to the user. In one example, the catalog of media files can be presented to the user as a listing of media files in different categories (e.g., videos, audio, images, other (text), etc.), where the name (e.g., the title of the movie, song, image, etc.) and/or other information (e.g., file extension associated with media file, file size, etc.) associated with the content of each media file is displayed. It is noted that the catalog of media files can be presented to the user in various ways. In one example, a complete listing of the media files can be presented to the user organized by the different categories. In another example, different icons can be presented for the different categories of media files and the user can select which category of media files the user wants to view.

In some implementations, in response to the router 110 discovering the media files and obtaining the file name, file extension and metadata associated with the media files, the router 110 can determine the type, title, and other information associated with the content of each media file. For example, the router 110 can parse the name and/or metadata of each of the media files to determine the title (e.g., the title of the movie, song, image, etc.) and/or other information (e.g., genre, artist(s), album name, etc.) associated with the content of each media file. In some implementations, after determining the type of media file and the title associated with the content of the media file, the router 110 can search the Internet to find additional information associated with the file content (e.g., information that matches the title of the file content). For example, if the router 110 determines that a media file is a movie and determines the title of the movie, the router 110 can search the Internet to find a text description of the movie, movie critic reviews, and/or a preview of the movie. In another example, if the router 110 determines that the media file is a song and determines the name of the song, the router 110 can search the Internet to find an image of the album cover, song lyrics, and/or a preview of the song. The router 110 can include this additional information (and/or a link to the additional information) associated with the file content in the catalog information/files the router 110 sends out to the network device 122 or web servers. In this case, when the catalog of the media files is presented to the user, the additional information (e.g., content description, reviews, thumbnail image, etc.) would also be presented to the user (e.g., when the user selects one or more of the media files). For example, for an audio file, a thumbnail image of the album cover could be displayed next to the name of the song. Also, the user interface can allow the user to interact with the information; for example, if the user double-clicks on the title of a movie, the description or reviews of the movie can be displayed. In some implementations, instead of the router 110 performing the Internet or database search for additional information associated with the file content, the router 110 sends the catalog information (e.g., type/category, file name, file extension, file size, content title, content genre, content artist, etc.) to the web servers, and the web servers (e.g., at the cloud 150) may perform the Internet search and add the additional information/files to the catalog for presentation to the user. In some implementations, the router 110 may also send the metadata associated with the content of each of the media files along with (or as part of) the catalog information. After block 210, the flow continues at block 212 of FIG. 3, which is a continuation of the flow diagram of FIG. 2 illustrating additional example operations for implementing the network media discovery and remote access mechanism, according to some embodiments.

At block 212, a message is received at the router 110 from the remote network node requesting one or more of the media files included in the catalog of media files being presented to the user. For example, when the user double-clicks or otherwise selects one or more of the media files via the user interface, a message is sent from the network device 122 to the router 110, or from the network device 122 to the cloud 150 (or other web servers) and then to the router 110 requesting the one or more media files (e.g., see file request 408 shown in FIG. 4). In one implementation, the request message received at the router 110 may include the name, title, type, and/or other information associated with the one or more requested media files. For example, the request message may indicate the type of media file (e.g., a music file) and the title and/or name of the media file (e.g., title of the song). In another implementation, the media discovery unit 112 may have associated each media file in the catalog (e.g., each catalog entry) with a catalog entry ID when creating the catalog, and the catalog entry IDs may be included as part of the catalog information. In this implementation, the request message received at the router 110 may indicate one or more catalog entry IDs associated with the one or more requested media files. After block 212, the flow continues at block 214.

At block 214, the one or more requested media files are identified based on the information included in the request message. In one implementation, the media discovery unit 112 identifies the one or more requested media files based on the information included in the request message. For example, the media discovery unit 112 identifies the one or more requested media files based on the name, title, type, catalog entry ID and/or other information included in the request message. Based on the information included in the request message, the media discovery unit 112 can identify the one or more requested media files by accessing and comparing the information included in the request message to the information of the catalog of media files stored at the router 110. Also, once the one or more requested media files are identified in the catalog of media files, the media discovery unit 112 can determine the location where the one or more requested media files are stored within the LAN 100 from the catalog information associated with the one or more requested media files. For example, the media discovery unit 112 can determine which one or more of the network devices 102 of the LAN 100 store the one or more requested media files (e.g., the address associated with the one or more network devices 102 where the one or more requested media files are stored). It is noted that, in some implementations, the remote media access unit 114 can operate in conjunction with the media discovery unit 112 to identify the one or more requested media files based on the information included in the request message. For example, the remote media access unit 114 can detect the request message received at the router 110 and then operate in conjunction with the media discovery unit 112 to identify the one or more requested media files. After block 214, the flow continues at block 216.

At block 216, the one or more requested media files are sent from the router 110 to the remote network node for presentation to the user. In some implementations, the one or more requested media files are sent from the corresponding network device 102 in the LAN, forwarded through the router 110 (e.g., via the remote media access unit 114), and to the WAN 140. In some cases, a requested media file may be temporarily stored at the router 110 and/or may be temporarily stored at the network device 122 or the web servers in the WAN 140. For example, a video or music file can be streamed from the LAN 100 to the network device 122 or to the cloud 150 for presentation to the user (e.g., via a browser or other application on the network device 122). The media files that are sent and temporarily stored may be automatically deleted when the user closes the content, when the content stops playing, when the user logs off or ends the session, etc. In some implementations, after the media discover unit 112 determines the location of the one or more requested media files (e.g., from the catalog information), the media discovery unit 112 and/or the remote media access unit 114 can retrieve the one or more requested media files from the corresponding one or more network devices 102 in the LAN 100 so that the remote media access unit 114 can forward the media files to the WAN 140. In one example, after the media discover unit 112 determines the location of the one or more requested media files (e.g., from the catalog information), the media discovery unit 112 and/or the remote media access unit 114 can send a request message (e.g., file request 410 shown in FIG. 4) for the corresponding one or more network devices 102 to send the one or more requested media files to the router 110 (e.g., requested file(s) 412 shown in FIG. 4). The remote media access unit 114 can then forward the media files (e.g., requested file(s) 414 shown in FIG. 4) to the remote network device 122 in the WAN 140. In some implementations, the media discovery unit 112 and/or the remote media access unit 114 of the router 110 can forward the media files to one or more destination addresses (e.g., IP addresses) associated with the remote network node (e.g., the network device 122 or the cloud 150). After block 216, the flow continues at block 218.

At block 218, it is determine whether an additional request message is received at the router 110 for one or more media files from the remote network node. If it is determined that an additional request message is received, the flow loops back to block 214, where the one or more additional requested media files are identified. If it is determined that no additional request messages are received, the flow continues at block 220.

At block 220, it is determined whether the user has logged out at the remote network node. If it is determined that the user has logged out, the flow ends. If it is determined that the user has not logged out, the flow loops back to block 218, where it is determined whether an additional request message is received at the router 110 from the remote network node.

It should be understood that FIGS. 1-3 and the operations described herein are examples meant to aid in understanding embodiments and should not be used to limit embodiments or limit scope of the claims. Embodiments may perform additional operations, fewer operations, operations in a different order, operations in parallel, and some operations differently. In some implementations, the router 110 can continuously or periodically perform the discovery procedure in the LAN 100 to maintain an updated catalog of the media files available in the various network devices 102 of the LAN 100. In addition, the router 110 can perform the discovery procedure based on one or more events detected in the LAN 100 (e.g., if a new network device 102 joins the network or if an existing network device 102 leaves the network). In one example, in response to detecting a network event indicating a new network device 102, the router 110 may discover only the media and text files stored in the new network device 102 (and wait to perform the full discovery procedure until the next scheduled time). In another example, in response to detecting a network event indicating an existing network device 102 has left the LAN 100 (or is unavailable or malfunctioning), the router 110 may only delete the media and text files associated with that particular network device 102 from the catalog of files (and wait to perform the full discovery procedure until the next scheduled time). In some implementations, since the router 110 creates and stores the catalog of the media files discovered in the network devices 102 of the LAN 100 (e.g., a listing of the media files and metadata), and does not store the actual (or complete) media file, the router 110 may be designed with the typical amount of memory and storage for a router/gateway. The router 110 may allow a remote user access to a complete and updated list of most or all of the media files stored in various network devices 102 of the LAN 100 without having to store the complete media files at the router 110, and without having to update the complete media files when a change is detected.

In some embodiments, in addition to discovering media files available in the network devices 102 of the LAN 110, the media discovery unit 112 of the router 110 can also implement discovery techniques to find media files (and other types of files) stored in web-based or cloud-based storage accounts (hereinafter, WAN-based storage accounts) associated with the users/owners of the LAN 100. After discovering the media files that are stored in the WAN-based storage accounts, a catalog entry associated with these media files can also be included in the same catalog of media files that was described above with reference to FIGS. 2-3. For instance, in some implementations, the users/owners of the LAN 100 can provide the usernames/passwords and other login credentials to the router 110, and the router 110 can store the login credentials for later use during the discovery process. During the discovery process, the router 110 can use the login credentials to access the WAN-based storage accounts. Similarly as described above, after login, the router 110 can obtain information (e.g., file name, file extension, and/or metadata) associated with the media and text files that are stored in the WAN-based storage accounts, in order to create the catalog entries associated with the files. In a similar manner, in some implementations, the router 110 may implement discovery techniques to detect files associated with other types of WAN-based accounts, such as social media accounts, web-based email accounts, etc., and create catalog entries for these files.

In some embodiments, the router 110 may also allow users to remotely manage the settings of the router 110 and/or remotely perform diagnostic analysis on the router 110. In one example, the router 110 may allow the users to manage and update the parental control settings on the router 110. In some embodiments, in addition to providing access to media, text, and other data files in the LAN 100, the router 110 may also discover configuration files or other types of files in the LAN 100 that allow the user to remotely manage, program, and/or control some devices in the LAN 100, such as smart appliances, digital thermostats, digital video recorders (DVRs), etc. Remote access to these types of devices in the LAN 100 may also be provided using the catalog that is created at the router 110 and sent to the remote nodes (e.g., web servers or remote client computer) in the WAN 140. For example, the catalog may also include the configuration files, address information, security information, user credentials and/or other types of files/information that allows the user to remotely manage, program, and/or control some of the devices in the LAN 100.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
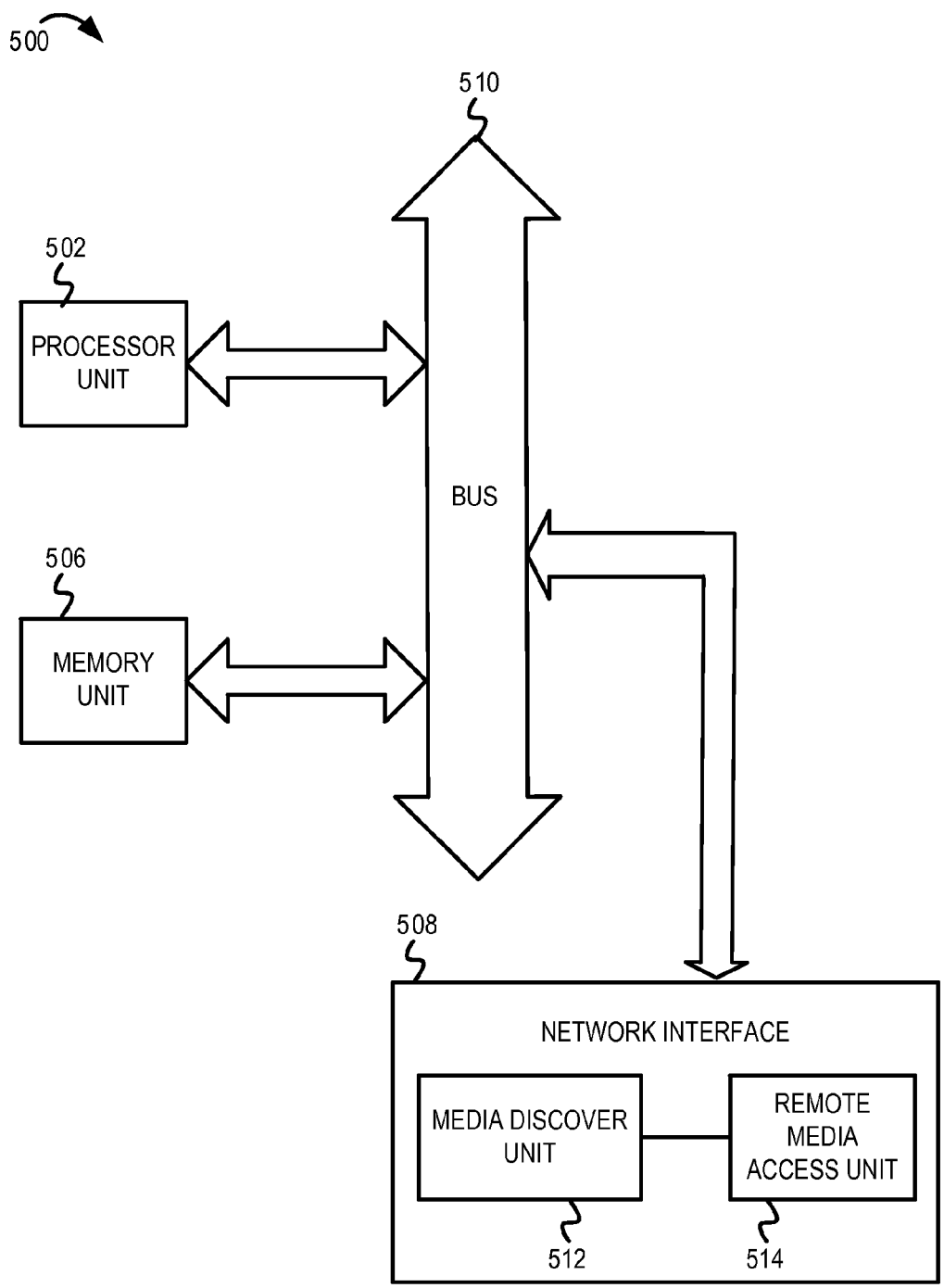
FIG. 5 is a block diagram of one embodiment of a network device including a mechanism for network media discovery and remote access in a wide area network, according to some embodiments.

FIG. 5 is a block diagram of one embodiment of a network device 500 including a mechanism for network media discovery and remote access in a wide area network. In some implementations, the network device 500 is a network traffic managing node between two or more networks (e.g., a LAN and a WAN) that receives, processes, and routes packets associated with the networks; for example, the network traffic managing node may be a router/gateway of a LAN (e.g., LAN 100 shown in FIG. 1). It is noted, however, that in other implementations the network device 500 may be other suitable types of network devices that can be configured to implement the functionality described above with reference to FIGS. 1-4, such as a cable modem, a wireless access point, a network bridge, a network switch, a desktop computer, a gaming console, a mobile computing device, etc. The network device 500 includes a processor unit 502 (possibly including multiple processors, multiple cores, multiple nodes, and/or implementing multi-threading, etc.). The network device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The network device 500 also includes a bus 510 (e.g., PCI, ISA, PCI-Express, HyperTransport®, InfiniBand®, NuBus, AHB, AXI, etc.), and network interface(s) 508 that include at least one of a wireless network interface (e.g., a Bluetooth interface, a WLAN 802.11 interface, a WiMAX interface, a ZigBee® interface, a Wireless USB interface, etc.) and a wired network interface (e.g., an Ethernet interface, a powerline communication interface, etc.). As illustrated, the network interface(s) 508 also includes a media discovery unit 512 and a remote media access unit 514. For example, the media discovery unit 512 and the remote media access unit 514 may be implemented within a network interface card or network interface module of the network interface(s) 508. The media discovery unit 512 and the remote media access unit 514 may be operable to implement the network media discovery and remote access mechanism for the network device 500, as describe above with reference to FIGS. 1-4.

Any one of these functionalities may be partially (or entirely) implemented in hardware and/or on the processor unit 502. For example, the functionality may be implemented with one or more application specific integrated circuits, one or more system-on-a-chip (SoC), or other type of integrated circuit(s), in logic implemented in the processor unit 502, in a co-processor on a peripheral device or card, in a separate processor and/or memory implemented within the network interface 508, etc. Further, realizations may include fewer or additional components not illustrated in FIG. 5 (e.g., video cards, audio cards, additional network interfaces, peripheral devices, etc.). The processor unit 502, the memory unit 506, and the network interfaces 508 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for implementing a network connected media gateway as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for discovery of files in a local area network, the method comprising:
    discovering, by a router in the local area network, a plurality of files stored in a plurality of network devices of the local area network;
    creating, by the router, a catalog of the plurality of files based, at least in part, on information associated with the plurality of files;
    receiving, by the router, a first message from a remote network node of a wide area network, the first message requesting access to the plurality of files; and
    providing, by the router, the catalog of the plurality of files to the remote network node of the wide area network in response to receiving the first message;
    detecting, by the router, a change associated with the plurality of files stored in the local area network; and
    updating, by the router, the catalog of the plurality of files after detecting the change.

2. The method of claim 1, further comprising:
    providing, by the router, one or more files to the remote network node in response to receiving a second message from the remote network node requesting the one or more files from the catalog of the plurality of files.

3. The method of claim 1, wherein the router includes a processor, a memory, and a network interface for communication with the local area network and the wide area network.

4. The method of claim 1, wherein said detecting the change associated with the plurality of files and updating the catalog of the plurality of files comprises:
    determining, by the router, one or more new files have been stored in the local area network; and
    updating, by the router, the catalog of the plurality of files after determining the one or more new files have been stored in the local area network.

5. The method of claim 1, further comprising:
    receiving a second message from the remote network node requesting one or more files from the catalog of the plurality of files, the second message including information associated with the one or more files;
    identifying the one or more files requested by the remote network node from the catalog of the plurality of files based, at least in part, on the information associated with the one or more files; and
    providing the one or more files to the remote network node.

6. The method of claim 5, wherein said identifying the one or more files requested by the remote network node from the catalog of the plurality of files comprises:
    determining one or more catalog entry identifiers included in the second message, the one or more catalog entry identifiers associated with the one or more files; and
    identifying the one or more files based, at least in part, on the one or more catalog entry identifiers.

7. The method of claim 5, further comprising:
    determining one or more of the plurality of network devices on which the one or more files are stored.

8. The method of claim 7, further comprising:
    transmitting, from the router, a third message requesting the one or more of the plurality of network devices to provide the one or more files to the remote network node via the router.

9. The method of claim 7, further comprising:
    retrieving, by the router, the one or more files from the one or more of the plurality of network devices to provide the one or more files from the router to the remote network node.

10. The method of claim 1, further comprising:
    determining information associated with the plurality of files from the plurality of network devices, the information including at least one member selected from the group consisting of file names, file extensions, and metadata associated with the plurality of files; and
    organizing the catalog of the plurality of files according to at least one member of the group consisting of the file names, the file extensions, and the metadata associated with the plurality of files.

11. The method of claim 1, further comprising:
   determining information associated with the plurality of files from the plurality of network devices, the information including at least one member selected from the group consisting of file names, file extensions, and metadata associated with the plurality of files;
   parsing the metadata associated with the plurality of files to determine additional information associated each of the plurality of files; and organizing the catalog of the plurality of files according to at least one member selected from the group consisting of the file names, the file extensions, and the additional information parsed from the metadata.

12. The method of claim 1, further comprising determining information associated with the plurality of files from the plurality of network devices, the information including at least one member selected from the group consisting of a type of file associated with each of the plurality of files and information associated with content of each of the plurality of files.

13. The method of claim 12, wherein said creating the catalog of the plurality of files comprises creating the catalog of the plurality of files organized according to the type of file associated with each of the plurality of files and the information associated with the content of each of the plurality of files.

14. The method of claim 1, further comprising, in response to receiving a second message from the remote network node requesting one or more files from the catalog of the plurality of files, providing the one or more files to the remote network node by at least one member selected from the group consisting of transmitting a copy of each file to the remote network node, streaming each file to the remote network node, and providing the remote network node access to the one or more files stored at the plurality of network devices via the router.

15. The method of claim 1, wherein said detecting the change associated with the plurality of files comprises at least one member selected from the group consisting of:
   detecting, by the router, the change associated with the plurality of files based, at least in part, on performing a discovery procedure periodically; and
   detecting, by the router, one or more new network devices have been added to the local area network.

16. The method of claim 1, wherein at least a subset of the plurality of files stored in the plurality of network devices of the local area network include media files.

17. The method of claim 1, wherein at least a subset of the plurality of network devices of the local area network comprise at least one member selected from the group consisting of a notebook computer, a tablet computer, a mobile phone, a desktop computer, a gaming console, a digital camera, a television, and a smart appliance.

18. The method of claim 1, wherein the remote network node of the wide area network comprises a remote computer system communicatively coupled with an Internet.

19. A router in a local area network, the router comprising:
   a processor;
   a media discovery unit coupled with the processor and configured to:
      discover a plurality of files stored in a plurality of network devices of the local area network;
      create a catalog of the plurality of files based, at least in part, on information associated with the plurality of files; and
   a remote media access unit coupled with the processor and configured to:
      receive a first message from a remote network node of a wide area network, the first message requesting access to the plurality of files;
      provide the catalog of the plurality of files from the router to the remote network node of the wide area network in response to receiving the first message;
      receive a second message from the remote network node, the second message requesting one or more files from the catalog of the plurality of files; and
      provide the one or more files to the remote network node in response to receiving the second message;
   wherein the media discovery unit is further configured to:
      detect a change associated with the plurality of files stored in the local area network; and
      update the catalog of the plurality of files after detecting the change.

20. The router of claim 19, wherein the media discovery unit configured to detect the change and update the catalog of the plurality of files comprises the media discovery unit configured to:
   determine one or more new files have been stored in the local area network; and
   update the catalog of the plurality of files after determining the one or more new files have been stored in the local area network.

21. The router of claim 19, wherein the remote media access unit is further configured to determine one or more of the plurality of network devices on which the one or more files are stored.

22. The router of claim 19 wherein the remote media access unit is further configured to:
   receive the second message from the remote network node requesting the one or more files from the catalog of the plurality of files, the second message including information associated with the one or more files;
   identify the one or more files requested by the remote network node from the catalog of the plurality of files based, at least in part, on the information associated with the one or more files;
   determine one or more of the plurality of network devices on which the one or more files are stored; and
   provide the one or more files to the remote network node.

23. The router of claim 19, wherein the remote media access unit is further configured to:
   determine one or more catalog entry identifiers included in the second message, the one or more catalog entry identifiers associated with the one or more files; and
   identify the one or more files based, at least in part, on the one or more catalog entry identifiers.

24. The router of claim 19, wherein the media discovery unit is further configured to determine the information associated with the plurality of files from the plurality of network devices, the information including at least one member selected from the group consisting of file names, file extensions, and metadata associated with the plurality of files.

25. The router of claim 19, wherein the media discovery unit is further configured to determine the information associated with the plurality of files from the plurality of network devices, the information including at least one member selected from the group consisting of a type of file associated with each of the plurality of files and information associated with content of each of the plurality of files.

26. A network router of a local area network, the network router comprising:
   a network interface;

one or more processors coupled with the network interface; and a memory to store instructions which, when executed by the one or more processors, cause the network router to perform operations that comprise:
- creating a catalog of a plurality of files stored in a plurality of network
  - devices of the local area network based, at least in part, on information associated with the plurality of files;
- receiving a first message from a remote network node of a wide area network, the first message requesting access to the plurality of files;
- providing the catalog of the plurality of files from the network router to the remote network node of the wide area network in response to receiving the first message;
- receiving a second message from the remote network node, the second message requesting one or more files;
- identifying the one or more files from the catalog of the plurality of files based, at least in part, on one or more catalog entry identifiers included in the second message, the one or more catalog entry identifiers associated with the one or more files;
- providing the one or more files to the remote network node;
- detecting a change associated with the plurality of files stored in the local area network; and
- updating the catalog of the plurality of files after detecting the change.

27. The network router of claim 26, wherein the instructions executed by the one or more processors cause the network router to perform operations that further comprise:
- discovering the plurality of files stored in the plurality of network devices of the local area network; and
- determining the information associated with the plurality of files from the plurality of network devices.

28. A non-transitory machine-readable storage medium having instructions stored therein, which when executed by one or more processors cause the one or more processors to perform operations that comprise:
- discovering, by a router in a local area network, a plurality of files stored in a plurality of network devices of the local area network;
- creating, by the router, a catalog of the plurality of files based, at least in part, on information associated with the plurality of files;
- receiving, by the router, a first message from a remote network node of a wide area network, the first message requesting access to the plurality of files;
- providing, by the router, the catalog of the plurality of files to the remote network node of the wide area network in response to receiving the first message;
- detecting, by the router, a change associated with the plurality of files stored in the local area network; and
- updating, by the router, the catalog of the plurality of files after detecting the change.

29. The non-transitory machine-readable storage medium of claim 28, wherein the operations further comprise:
- providing, by the router, one or more files to the remote network node in response to receiving a second message from the remote network node requesting the one or more files from the catalog of the plurality of files.

30. The non-transitory machine-readable storage medium of claim 28, wherein the operations further comprise:
- receiving a second message from the remote network node requesting one or more files from the catalog of the plurality of files, the second message including information associated with the one or more files;
- identifying the one or more files requested by the remote network node from the catalog of the plurality of files based, at least in part, on the information associated with the one or more files; and
- providing the one or more files to the remote network node.

31. The non-transitory machine-readable storage medium of claim 30, wherein said operations of identifying the one or more files requested by the remote network node from the catalog of the plurality of files comprise: determining one or more catalog entry identifiers included in the second
- message, the one or more catalog entry identifiers associated with the one or more files; and
- identifying the one or more files based, at least in part, on the one or more catalog entry identifiers.

32. The non-transitory machine-readable storage medium of claim 28, wherein said operations further comprise determining the information associated with the plurality of files from the plurality of network devices.

* * * * *